I. HAYMAN.
CUSHION WHEEL.
APPLICATION FILED FEB. 18, 1918.
1,280,220.
Patented Oct. 1, 1918.
2 SHEETS—SHEET 1.
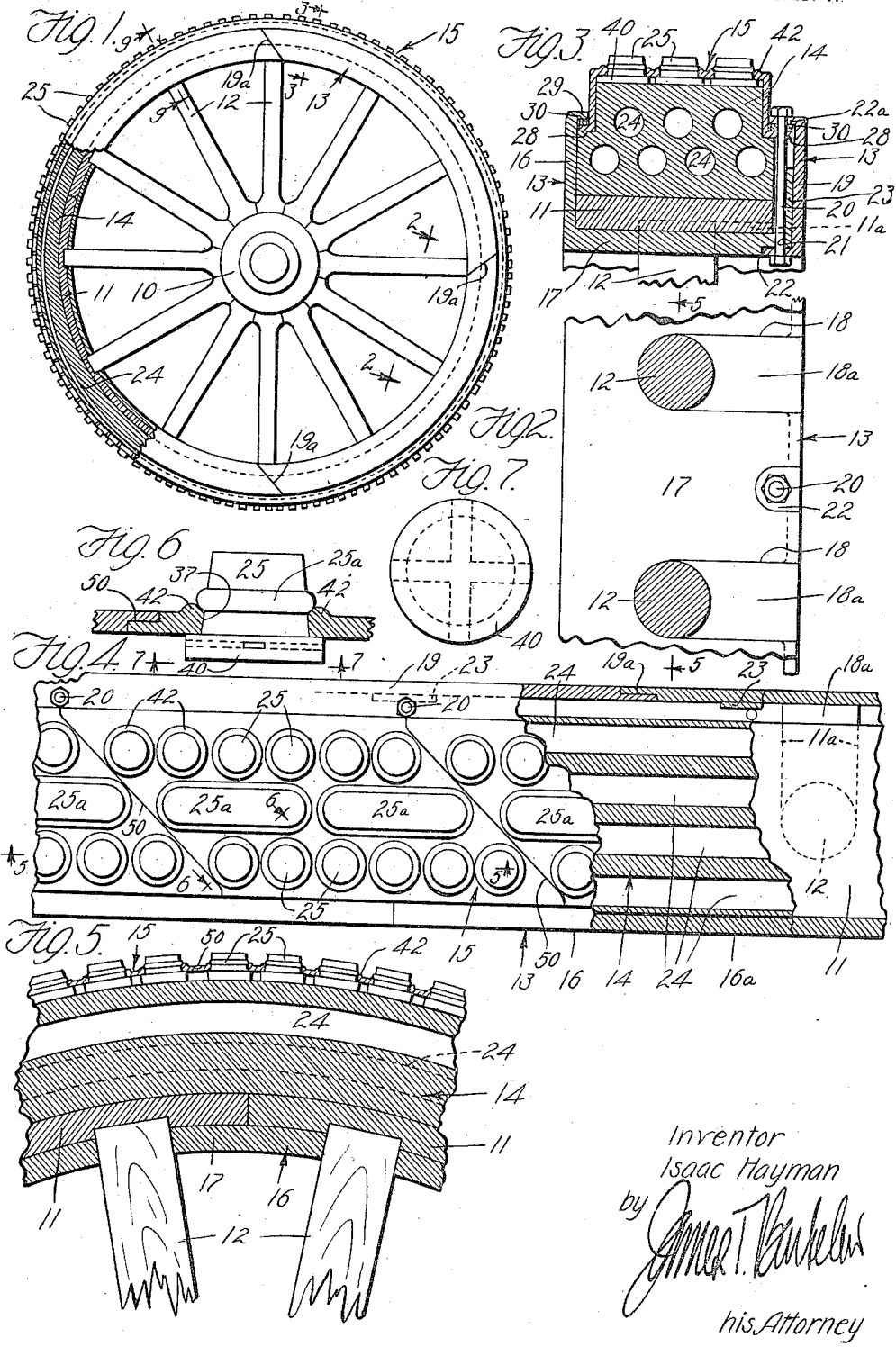
Inventor
Isaac Hayman
by James T. Banhelm
his Attorney I. HAYMAN.
CUSHION WHEEL.
APPLICATION FILED FEB. 18, 1918.
1,280,220.
Patented Oct. 1, 1918.
2 SHEETS—SHEET 2.
Fig. 8.
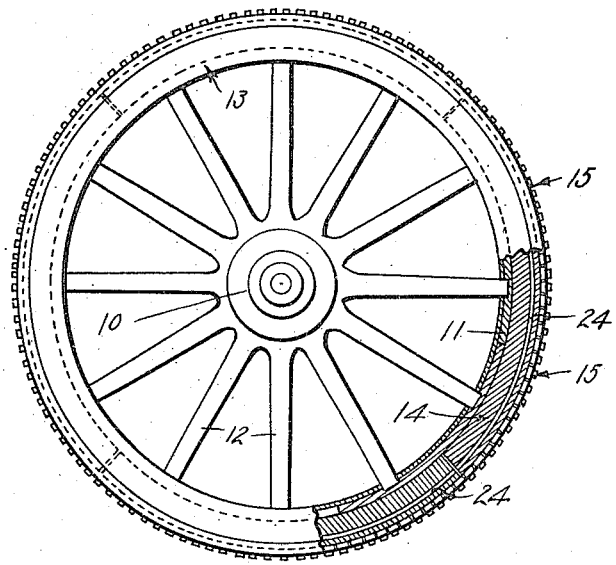
Fig. 9.
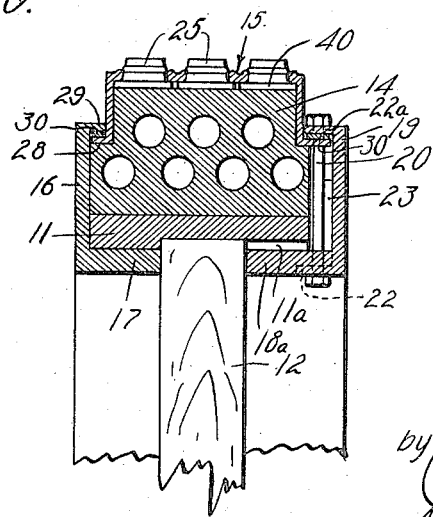
Inventor
Isaac Hayman
by
his Attorney

UNITED STATES PATENT OFFICE.

ISAAC HAYMAN, OF LOS ANGELES, CALIFORNIA.

CUSHION-WHEEL.

1,280,220.	Specification of Letters Patent.	Patented Oct. 1, 1918.

Application filed February 18, 1918. Serial No. 217,776.

*To all whom it may concern:*

Be it known that I, ISAAC HAYMAN, a citizen of the United States, residing at Los Angeles, in the county of Los Angeles, State of California, have invented new and useful Improvements in Cushion-Wheels, of which the following is a specification.

This invention relates to a cushion tire or wheel for motor vehicles and the like. And it is an object to provide a tire construction that is sightly, inexpensive, in both original cost and up-keep, capable of hard wear, and giving high qualities of resiliency.

It is an object of this invention to provide a structure in simple and economic form which combines the good qualities of pneumatic and cushion tires; to provide a structure in which worn parts are easily replaced or renewed. Pneumatic tires of the type now commonly used are of high initial cost and of high mileage cost. Cushion tires are of lower mileage cost but lack the resiliency of pneumatic tires. In pneumatic tires the high air pressure puts a constant strain upon the casing and causes ruptures when the casing wears thin. By my invention I provide a tire that combines the good resiliency of a pneumatic tire with the good wearing quality of a cushion or solid tire; and further provide renewability of the tread part, so that, outside of the renewal of tread parts, my cushion tire may be said to have indefinite life.

My improved construction embodies a rim structure or case which is designed so that it may be placed on any automobile wheel, said structure fitting onto the spokes and over and around the felly of the wheel. This structure or case is made so that it has a smooth exterior presenting a sightly appearance and presenting no projecting parts liable to be damaged. It carries within it a resilient cushion and surrounding the cushion there is a tread which may be compressed inwardly to compress it upon the cushion. The tread is made in sections and may be provided with traction projections of rubber, fiber or the like.

This application is a divisional continuation, in part, of my application S. N. 129,211, filed November 2, 1916, for invisible cushion wheel.

The following detailed description sets forth a specific construction and the features of my device; and from this description the invention will be understood. For the purpose of this detailed description reference is had to the accompanying drawings in which—

Figure 1 is an outer side elevation, partly in section, of a wheel upon which my tire is mounted; Fig. 2 is an enlarged section taken on line 2—2 of Fig. 1; Fig. 3 is an enlarged cross-section of the tire taken on line 3—3 of Fig. 1; Fig. 4 is a plan view of a portion of the tread with parts broken away to make clear the construction; Fig. 5 is a section taken on line 5—5 of Fig. 2; Fig. 6 is an enlarged section taken on line 6—6 of Fig. 4; Fig. 7 is a view taken on line 7—7 of Fig. 6; and Fig. 8 is an elevation partly in section of the wheel, said view being taken on the side next the vehicle body, and Fig. 9 is a section similar to Fig. 3 taken on line 9—9 of Fig. 1.

In the drawing the numeral 10 designates a wheel having a felly 11 mounted on spokes 12. For the purpose of my invention this felly 11 may typify any rim or felly; or it may be especially arranged, as is hereinafter described. My rim structure 13 which holds cushion 14 and tread 15 is so constructed as to fit around felly 11 and form a sort of annular channel which is open on its outer face. This rim structure is made in two sides 16 and 19. The side 16 (the one which will be nearer the vehicle body) is constructed with a projecting flange 17 which extends under or inside the felly 11 and has slots or notches 18 which fit around spokes 12. Flange 17 extends from one side of the felly to the other. The side 19 of the rim structure comprises an annular plate which is secured to the flange 17 of side 16 by means of radial bolts 20 passing through holes 21 in the edge of flange 17 and passing through a peripheral inwardly extending flange 22ª which projects from the outer edge of the side plate 19. This plate 19 has projections 18ª from its inner edge in the plane of flange 17, which projections fit into the notches 18 and bear against the spokes, thus holding the whole structure against lateral displacement on the wheel felly, and holding the spokes tightly in the rim structure. The side 16 is preferably placed upon the inner side of the wheel and the side plate 19 upon the outer side of the wheel. The bolts 20 also pass through lugs 22 which project laterally inwardly from the side plate 19 and fit in counter-sinks in the flange 17. The outer plate 19 is preferably made in sections for ease of removal; the sections joining along diagonal overlapping joints which are shown at 19ª in Figs. 1 and 4. In order to properly support these sections against being forced outwardly, or inwardly, out of true position, I may provide radial lugs 23 preferably integral with flange 17, lying between bolts 20 and the side 19. These lugs may be made heavy and strong so as to hold the sections 19 in proper position.

In the form shown in Figs. 1 and 7, the side plate 19 is made in several sections, while the side 16 with its flange 17 may preferably be made in a single annular piece so as to be rigid and strong. Making side 19 in sections, facilitates the replacement of a tread member without having to take off the whole side 19.

Cushion 14 is mounted directly around and upon felly 11 and is held against lateral displacement by the rim structure 13. This cushion may be made of any suitable resilient material, preferably of a cellular rubber or the like; for instance, rubber with annular cavities 24. This cellular construction gives the rubber cushion a pneumatic action and pneumatic resiliency. This cushion is preferably an endless annular structure fitting tightly around the felly as is shown in Fig. 1. But it may be made in sections as is indicated in Fig. 8, for cheapness of manufacture.

Around the outside of cushion 14 and resting directly thereon and resiliently supported thereby, is a renewable tread 15 preferably made of a formed metal plate or sheet of suitable thickness. This tread is generally channel-shaped and has opposite side flanges 28 which extend under the peripheral inwardly projecting flange 22ª of side plate 19 and the similar opposite peripheral flange 29 of the side 16; washers 30 of felt, or rubber, or other suitable material being interposed to obviate rattling, and to make the structure water-tight, as hereinafter described. The flanges 28 are not held laterally between the sides 16 and 19 too tightly to prevent easy movement inwardly against the cushion, 14. The cushion 14 is preferably shaped to fit within the tread 15 and support the tread at all points, being stepped on its sides to support the flanges 28. The tread 15 may be utilized, if desired, as an all metal tread, and for this purpose may be provided with tread projections of any desired character. However, I prefer to use tread buttons 25 or 25ª. These buttons may be of any superficial shape; I indicate round and elongated buttons in the drawings. These buttons may be tapered as shown, made of rubber, fiber or any suitable material, and are provided with inner flanges or enlargements 40 which prevent their passing out through the openings 37 in the tread 15. The heads 40 are preferably reinforced with metal in the shape and position shown in Figs. 6 and 7; and these heads seat directly upon the cushion 14. Around each opening 37 there is a rounded flange or rim 42 which supports the button and prevents its being sheared or broken off. In practical use the pins form yielding cushions which individually compress and flatten to give a first easy yielding action; and then the pins, by a greater stress cause compression of the cushion 14. After the buttons are compressed, the whole tread section or sections are moved inwardly, bringing into play a reserve resiliency which absorbs the greater stresses and shocks. The pins are so made that after their initial compression they then move inwardly with the tread section and not through it.

The tread 15 is preferably made in sectional plates which join each other along diagonal overlapping joints 50 as shown in Figs. 2 and 5. These diagonal and overlapping joints provide that adjacent tread sections may compress the same part of the cushion by simultaneous action together. When it is necessary to renew the buttons or to renew a tread plate, any one or all of the tread plates may be easily removed by first removing one or more of the side plate sections 19.

It will be understood that the rim structure performs the function of strengthening and stiffening the felly, so that, even if the usual metallic felly rim is removed in order to use my device, the wheel will still be strong and rigid. This reinforcing function of the device is due specifically to the fact that my rim structure incloses or boxes in the felly, the flange 17 reinforcing the felly from the inside, and no bolts, etc., being passed through the felly to weaken it. The felly is left intact and is reinforced.

The felly 11 may be the original felly of the wheel or it may be a special felly which I provide. Whatever its nature, in the preferred form of device herein described it will be in sections, as is indicated in Figs. 1 and 5, in order to assemble my device upon the spokes. The felly sections may be notched, at 11ª, like the flange 17 is notched (the notches in the felly extending only partly through the felly, however, as is shown in Fig. 3) and the felly sections may first be placed in the part 16—17 of the frame or case. These assembled parts are then put in position upon the spokes and the cushion 14 next put in place. The tread sections 15 are next placed in position, and the side sections 19 then secured in place. It will be seen that the felly, preferably of wood, becomes primarily a seat for the rubber cushions, spacing the cushions from the metal parts of the frame or case. The spokes held in the felly frame and the frame forming a rigid stiff ring, reinforce the felly. In fact it is the rim structure that takes the shocks and stresses due to road impact; and if desired the felly itself (11) may be omitted.

In order to make the device water-tight, and prevent entry of mud, dust and sand, I preferably provide the buttons 25 with slight bulges or enlargements at 25ª to prevent the buttons being forced back through the tread plates when in contact with the road; the buttons compressing and flattening out and making a fluid-tight joint with the tread plates. This, however might be accomplished by making the buttons fit tightly in the perforations and without the necessity of using the bulges. In order to make a tight joint between the tread plates and the members 16 and 19 I provide the washers 30 of soft, highly resilient rubber and of such size as will compass and expand throughout the whole movement of the tread and keep in contact with the flanges 29 and 28 at all times. With these provisions it will be seen that the cushion 14 is not only covered and mechanically protected by the case or frame, but is also inclosed in a fluid and dust-proof casing and thus preserved from deterioration.

Having described my invention, I claim:

1. In combination with a wheel having a felly and spokes, a tire structure embodying a channel-shaped case having a flange fitting within the wheel felly and two sides on opposite sides of the felly, and a resilient tire element upon and around the felly and held between the two sides.

2. In combination with a wheel having a felly and spokes, a tire structure embodying a channel-shaped case having a flange fitting within the wheel felly and two sides on opposite sides of the felly, and a resilient tire element upon and around the felly and held between the two sides; said flange being notched to fit over the spokes; and means for securing the two sides in position with relation to each other.

3. In combination with a wheel having a felly and spokes, a tire structure embodying a channel-shaped case having a flange fitting within the wheel felly and two sides on opposite sides of the felly, and a resilient tire element upon and around the felly and held between the two sides; the two sides being separable from each other, one of said sides having an inner laterally extending flange which extends across the inner face of the felly, said flange being notched to fit around the spokes, the other side having projections extending into said notches and fitting against the spokes, and means for holding the two sides together.

4. In combination with a wheel having a felly and spokes, a tire structure embodying a channel-shaped case having a flange fitting within the wheel felly and two sides on opposite sides of the felly, and a resilient tire element upon and around the felly and held between the two sides; the two sides being separable from each other, one of said sides having an inner laterally extending flange which extends across the inner face of the felly, said flange being notched to fit around the spokes, the other side having projections extending into said notches and fitting against the spokes, and means for holding the two sides together, said means not passing through the felly.

4. In combination with a wheel having spokes, an annular rim structure having two annular sides, one side having a laterally projecting flange at its inner periphery, said flange having notches extending from its outer edge to fit around the spokes, the other side having projections fitting into the notches and bearing against the spokes therein, and means to hold the two sides together.

6. In combination with a wheel having spokes, an annular rim structure having two annular sides, one side having a laterally projecting flange at its inner periphery, said flange having notches extending from its outer edge to fit around the spokes, the other side having projections fitting into the notches and bearing against the spokes therein, means to hold the two sides together, and radial projections on the outer edge of the flange against which the second mentioned side bears.

7. In combination with a wheel having spokes, an annular rim structure having two annular sides, one side having a laterally projecting flange at its inner periphery, said flange having notches extending from its outer edge to fit around the spokes, the other side having projections fitting into the notches and bearing against the spokes therein, and means to hold the two sides together embodying radial bolts passing through the flange and through the second mentioned side, and radial projections on the outer edge of the flange extending between the second mentioned side and the bolts.

8. In combination with a wheel having spokes, an annular rim structure having two annular sides, one side having a laterally projecting flange at its inner periphery said flange having notches extending from its outer edge to fit around the spokes, the other side having projections fitting into the notches and bearing against the spokes therein, means to hold the two sides together embodying radial bolts passing through the flange and through the second mentioned side and radial projections on the outer edge of the flange extending between the second mentioned side and the bolts, said second mentioned side being in separate sections.

9. In combination with a wheel having spokes, an annular rim structure having two annular sides, one side having a laterally projecting flange at its inner periphery, said flange having notches extending from its outer edge to fit around the spokes, the other side having projections fitting into the notches and bearing against the spokes therein, means to hold the two sides together, said second mentioned side being in sections, and means on the flange to support the sections against lateral displacement.

In witness that I claim the foregoing I have hereunto subscribed my name this 12th day of February 1918.

ISAAC HAYMAN.

Witnesses:
VIRGINIA I. BERINGER,
W. N. MAXWELL.

Copies of this patent may be obtained for five cents each, by addressing the "Commissioner of Patents, Washington, D. C."